May 10, 1955 W. J. STRONG 2,707,851
TIRE SIDEWALL FINISHING MACHINE AND METHOD
Filed Oct. 1, 1953 5 Sheets-Sheet 1

INVENTOR.
WALTER J. STRONG
BY C. E. Tripp
ATTY

May 10, 1955 — W. J. STRONG — 2,707,851
TIRE SIDEWALL FINISHING MACHINE AND METHOD
Filed Oct. 1, 1953 — 5 Sheets-Sheet 2

INVENTOR.
WALTER J. STRONG
BY C. E. Tripp
ATTY.

May 10, 1955 W. J. STRONG 2,707,851
TIRE SIDEWALL FINISHING MACHINE AND METHOD
Filed Oct. 1, 1953 5 Sheets-Sheet 3

Fig-3

INVENTOR.
WALTER J. STRONG
BY
C. E. Tripp
ATTY.

May 10, 1955     W. J. STRONG     2,707,851
TIRE SIDEWALL FINISHING MACHINE AND METHOD
Filed Oct. 1, 1953     5 Sheets-Sheet 4

INVENTOR.
WALTER J. STRONG
BY C. E. Tripp
ATTY.

United States Patent Office 2,707,851
Patented May 10, 1955

2,707,851

TIRE SIDEWALL FINISHING MACHINE AND METHOD

Walter J. Strong, Cuyahoga Falls, Ohio, assignor to The B. F. Goodrich Company, New York, N. Y., a corporation of New York Application October 1, 1953, Serial No. 383,535

6 Claims. (Cl. 51—3)

This invention relates to cleaning the sidewall and abrading the annular rib on the sidewall of a pneumatic tire, operations that are most often carried out in the final preparation of white sidewall tires, which use of the invention will be the one described.

The manufacture of white sidewall tires includes vulcanization of the tire in a heated mold, the white sidewall layer having been applied before vulcanization. After cure, the surface of the white sidewall portion of the tire is usually smeared and soiled due to contact with the mold surface and due to handling of the tire. Furthermore, the white sidewall rubber and the black sidewall rubber usually overlap at one edge of the raised curb strip or rib of the tire, and such overlap is ordinarily along an irregular line within the confines of the curb strip. These conditions necessitate cleaning the white sidewall portion and abrading away an outer layer of the rib sufficiently to provide a regular, circular line of demarcation between the two colored layers of rubber.

One of the problems encountered in cleaning the white sidewall with prior machines is the tendency to smear the white sidewall resulting in a non-uniform appearance, which problem has been aggravated in prior devices of the type wherein the white sidewall cleaning members are rotating laminated fabric wheels. Also, prior devices have required a comparatively long time to complete the sidewall cleaning operation, which, coupled with occasional rejection of tires due to poor appearance of the cleaned sidewall, has added to the cost of manufacture of white sidewall tires.

I have found that an unsmeared and uniformly colored sidewall is attained if the white sidewall of the tire, instead of being rubbed or wiped by the cleaning means, is treated by completely and rapidly removing a very thin surface layer of sidewall rubber and foreign matter without roughening the surface, thereby exposing across the width of the sidewall a fresh surface. I have further found that fabric cleaning wheels do not remove a thin layer as mentioned but that the use of rotating brushes having radial bristles makes possible the type of uniform rapid cleaning action mentioned. However, I have found that such brushes operate as described above only if the cleaning is performed largely by the tips or ends of the bristles, as opposed to an action wherein the brush bristles are bent over substantially and hence the sides of the bristles are dragged across the face of the sidewall.

Since the tire sidewall is arcuate in cross-section, in devising a machine to carry out the above method of cleaning, I found that in the use of a single bristle brush across the sidewall causes sufficient deflection of the bristles at the midzone of the brush as to result in a smearing and slower cleaning action than is obtained at the edge zone wherein the tips of the brushes can be caused to perform the cleaning action. Physical space limitations render it mechanically inconvenient and costly to overcome this difficulty by employing a relatively large number of narrow brushes, and a concavely faced brush is an expensive, special and costly item, but I have found that the advantages of tip-end cleaning in terms of both excellence of finish and speed of operation can be attained by the use of only two flat faced brushes, each of which cleans substantially one-half of the radial extent of the sidewall, which brushes are positioned so that the deflection of the bristles at their midzones is in the order of one-fourth of the deflection of the corresponding bristles of a single brush adjusted to clean the entire sidewall.

From the above discussion it can be seen that the relative positions of the brushes and tire must be capable of accurate adjustment and that such adjustment should be maintained during the life of the brushes. Accordingly, I am able to take advantage of the improved cleaning action described by mounting the brushes on the frame of the machine, one at each side of the machine, so that once adjusted the brushes are fixed and maintain their adjustment, initiation and ending of cycle of operation being effected by moving the tire itself against and away from the cleaning brushes. I have also found that it is important to provide for brush adjustment not only for one size of tire, but for a range of tire sizes and to make such adjustments in a manner whereby critical adjustments are not destroyed or altered by subsequent adjustments.

In the machine of the invention each brush is capable of three adjustments: An angular adjustment arranged to insure that maximum bristle deflection occurs near the midzone of the sidewall area to be cleaned; and two rectilinear adjustments, one of which positions the brushes radially of the tire and the other of which is axial, determining brush pressure, and neither of which upset the rather critical angular adjustment. Since these adjustments need not be disturbed during the cleaning of a number of tires of the same size, uniform action can be expected throughout the life of the tire cleaning brushes.

As is well known in the tire art when white sidewall tires are manufactured it is virtually impossible to maintain a regular line of demarcation between the white and black sidewall rubber bodies. Accordingly it is customary to mold the tire so that any overlap that might occur takes place within the confines of the side rib or curb strip, whereupon the overlap is removed by a grinding or abrading process applied to the rib. This operation is most effectively performed on the same machine that cleans the sidewalls. With the machine of this invention, the abrading unit can be adjusted relative to the sidewall cleaning cycle so as to insure that the rib abrading process will be completed before the completion of the sidewall cleaning process, whereupon there will be no chance that the rib is not fully treated at the time that the tire proper is separated from the brushes by axial motion. In one form of the invention this operation is obtained by automatically shifting the abrasive belt clear of the tire before the sidewall cleaning cycle is completed.

I have further found that the abrading action on the rib produces an attractive, uniform finish by the use of a motor driven abrasive belt making line contact with the rib, with the midplane of the belt displaced somewhat from a parallel plane passing through the tire axis, so that the belt extends entirely across the rib without requiring an excessively wide belt that might introduce alignment problems. With the machine of this invention it is a simple matter to cause one of the sidewall cleaning brushes to act also upon the tire rib and since, in accordance with the invention, the rib abrading operation is completed before the tire is advanced clear of the brushes, both the tire and the rib present a uniform surface finish.

In addition to the advantages in operation and results described, I have found that the machine of this invention lends itself to a compact design having inherent rigidity so that adjustments in settings of the machine will be maintained over long periods of heavy duty, mass production operation. I have also found that the brushes and tire arrangement described briefly makes possible a very compact design occupying a minimum of floor space. Experiments made by testing an initial construction of an apparatus revealed that to obtain the advantages of accuracy, precise control, and rapid cleaning, it is essential that the tire be mounted so that the sidewall and rib rotate in one radial plane and that successive tires rotate in the same radial plane otherwise these parts will be brought into a radial plane of the brushes and abrasive belt at the expense of eccentricity relative to the tire and if successive tires do not rotate in the same radial plane some will be ground more than others. To this end I have found that the tire should be retained on a solid, true running rim, by inflation as a tubeless tire. The manner whereby the aforesaid improved results and advantages may be obtained will be apparent from the following detailed description of a preferred embodiment of the invention and the accompanying drawings in which:

General description

Machine 10 includes a centrally located tire mounting, rotating, and axial shifting assembly A to be referred to as a tire control assembly, which assembly includes a rim for mounting the tire, means for rotating the rim, and means for shifting the rim axially to and away from the working position. A rib or curb strip abrading assembly B is disposed generally below the tire control assembly, and includes a motor driven abrasive belt that engages and abrades the tire rib. There are two sidewall cleaning assemblies C and C' disposed at opposite sides of the tire control assembly, each of which include motor driven fiber brushes against which the tire sidewall is brought for sidewall cleaning, the arrangement being that one brush cleans a radially inner zone of the tire sidewall and the other brush cleans a radially outer zone of the tire sidewall.

The general operation of the machine is as follows:

A tire 11, having a sidewall 12 and a raised annular rib 13, is mounted on the tire control assembly A by means of a low-flange rim 14. The tire mounting rim has a forward position at which the tire is mounted, after which the tire is inflated, rotation of the tire begins and the tire is shifted axially rearwardly into contact with sidewall cleaning brushes 15 and 15'. At this time the abrasive belt unit is shifted axially forwardly to bring an abrasive belt 16 into pressure engagement with the tire rib 13 so that sidewall cleaning and abrading of the rib begins susbtantially simultaneously. The brush mountings are fixed during operation and so the brushes act on the tire for as long as the tire is held in the rearward position, but means are provided whereby the abrasive belt assembly may be shifted clear of the tire while the tire is being cleaned by the brushes because ordinarily the length of time required for completion of the sidewall cleaning operation exceeds that required for completion of the rib abrading operation. At the end of a predetermined period of time, the tire is again shifted to its forward position, clear of the brushes, tire rotation ceases, and air is exhausted from the tire to permit removal of the tire from the machine. The machine may also be set so as to cause the sidewall cleaning and rib abrading cycles to be co-extensive, by means of a selector switch in the control circuit. A complete description of a preferred embodiment of the invention so as to enable those skilled in the art to practice the invention follows:

Tire control assembly

Figure 2:
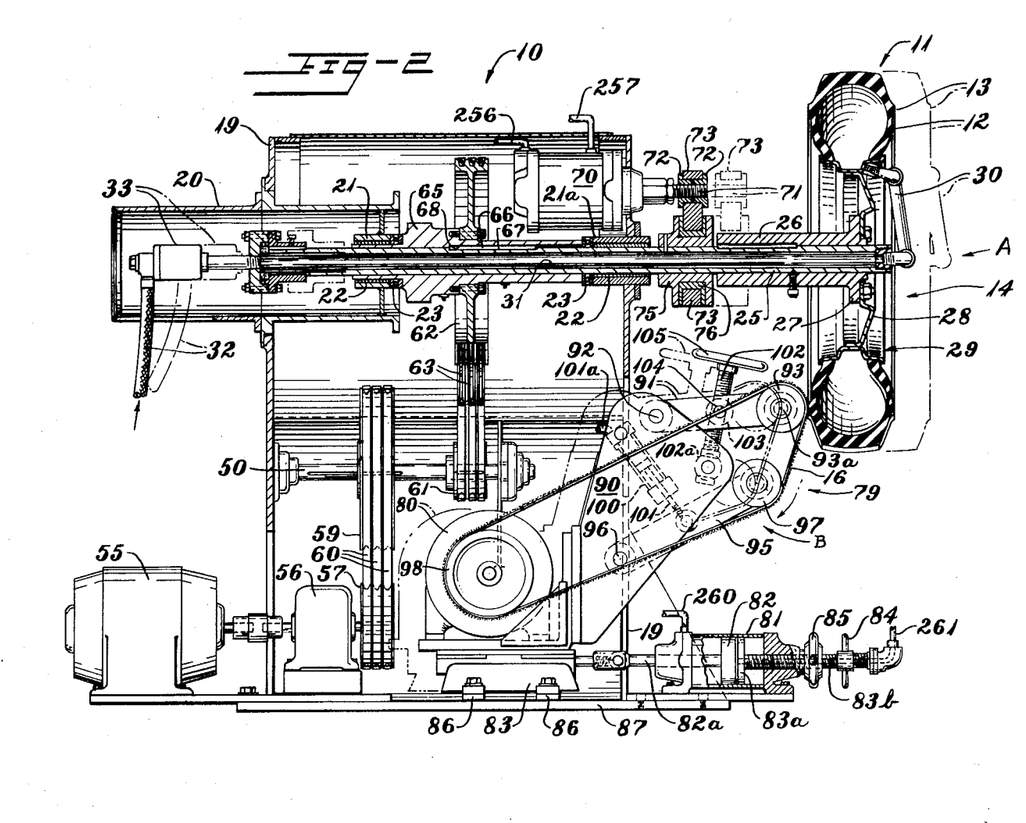
Fig. 2 is a sectional view taken on line 2—2 of Fig. 1, with all brush assembly elements omitted.

Referring to Fig. 2, a box like frame 19 has extending from the rear wall thereof a rigid casing 20 that mounts a rear spindle bearing assembly 21, there being a forward bearing assembly 21a fixed in the forward wall of the frame. Each bearing assembly includes a sleeve bearing 22 and a thrust bearing 23 for radial and axial support of a hollow spindle 25. Keyed to the hollow spindle forwardly of the frame is a sleeve 26 flanged as at 27 to mount a wheel disc 28 carrying a low flange drop center rim 29. An inflation pipe 30 communicates with a bore 31 within spindle 25, and bore 31 connects to air supply and exhaust line 32 by means of a swivel joint 33 that permits relative rotation of spindle 25 and line 32 by any of the well-known constructions designed for such service.

In order to cause rotation of the tire the hollow spindle 25 is motor driven. A tire rotation motor 55 is mounted on the base of frame 19 and its shaft drives a speed reducer 56 having a drive pulley 57. Additional speed reduction is accomplished by a jack shaft and pulley train wherein jack shaft 50, mounted on suitable bearings in the frame, carries a large pulley 59 driven by belts 60 from the speed reducer pulley 57, and a small pulley 61, that drives another large pulley 62 keyed to hollow spindle 25 the drive being by means of belts 63. Spindle pulley 62 is mounted on a flanged sleeve 65 which extends between opposed thrust bearings 23 and which is keyed to spindle 25 by key 66. Key 66 is axially fixed in a short spindle keyway 67, but keyway 68 in sleeve 65 is elongated so that spindle 25 is axially movable relative to sleeve 65. I have found that good results are had when the tire is rotated at about 35 R. P. M., while inflated by line 32 to a pressure of about 30 p. s. i. for passenger car tires.

As mentioned briefly in the general description, after the tire is placed on the rim and is inflated, it is necessary that the tire be moved rearwardly to engage the brushes that clean the sidewall. This is accomplished by an air cylinder 70 having a piston and a threaded piston rod 71 carrying opposed sleeve nuts 72 which embrace a yoke 73. A grooved collar 75 is fixed to spindle 25 and has an anti-friction liner 76 for the reception of yoke 73, there being relative rotation between collar 75 and yoke 73. Yoke 73 may be split across its width at the spindle axis and the parts bolted together after assembly in the grooved collar 75. Thus, the double acting cylinder 70 can advance and retract the tire.

Curb strip abrading assembly

Figure 3:
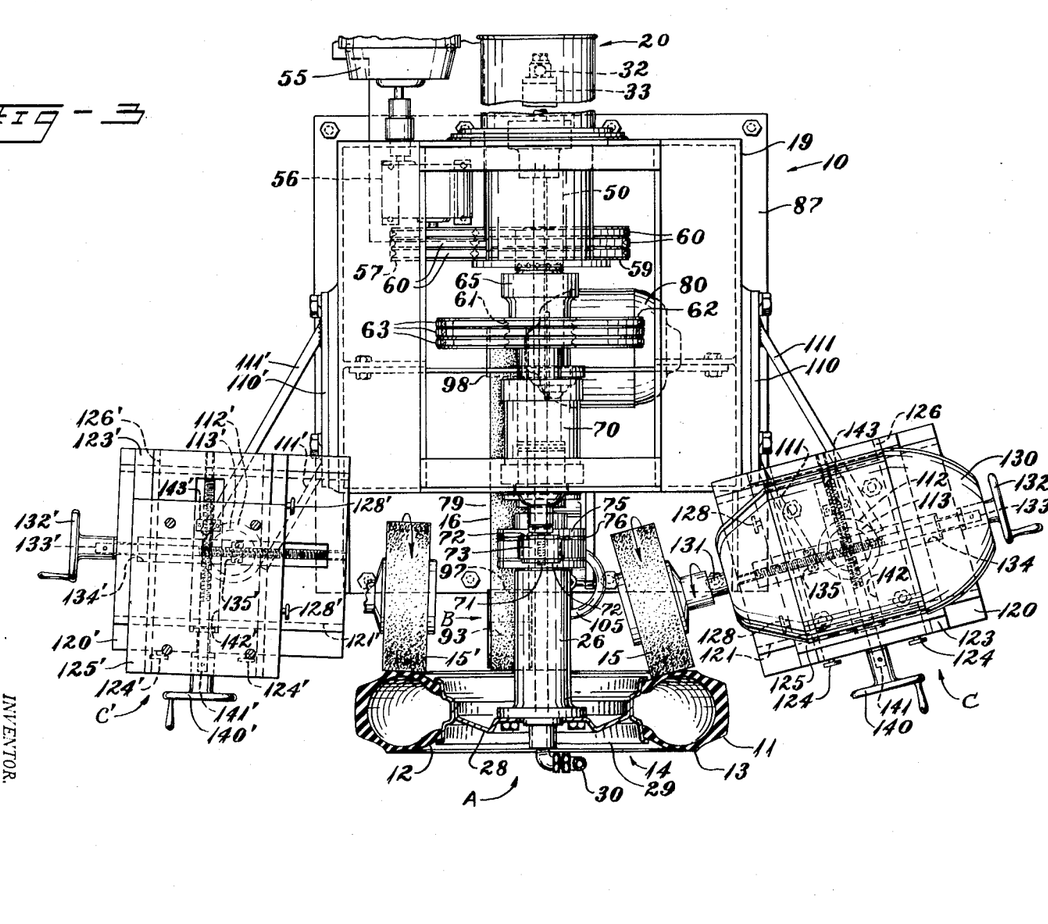
Fig. 3 is a plan view of the apparatus of Fig. 1, parts hvaing been broken away.

The curb strip abrading unit B includes an abrasive belt assembly 79, a belt drive motor 80, and a belt-positioning air cylinder 81 for shifting the belt assembly and motor from a rearward position wherein the belt clears the tire to a forward working position as shown in Figs. 2 and 3. Air cylinder 81 includes a piston 82 and piston rod 82a connected to the piston and linked to the belt assembly carriage 83. The forward (to the right in Fig. 2) position of the piston is determined by the position of a stop flange 83a disposed within the cylinder and mounted on a rod 83b threaded in the cylinder head. The position of the stop flange 83a can be varied by manipulating a handle 84 fixed to the threaded rod 83b, and the selected position is maintained by a lock nut 85 threaded on the rod.

Figure 1:
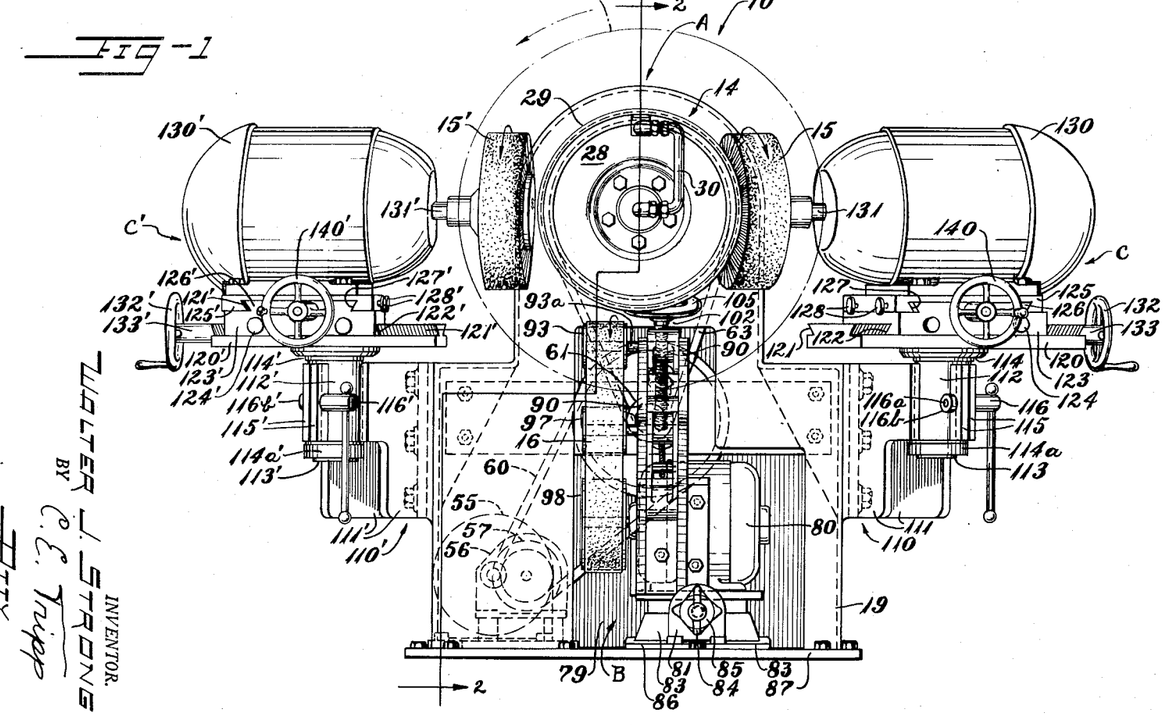
Fig. 1 is a front view of the apparatus embodying and made in accordance with the invention with a tire shown in broken lines.

In order to guide the abrasive belt assembly carriage two laterally extending cross members 86 are bolted to the base plate 87 of the frame and the cross members are dovetailed, as seen in Fig. 1, to slidably receive the base of carriage 83.

Figures 4, 6:
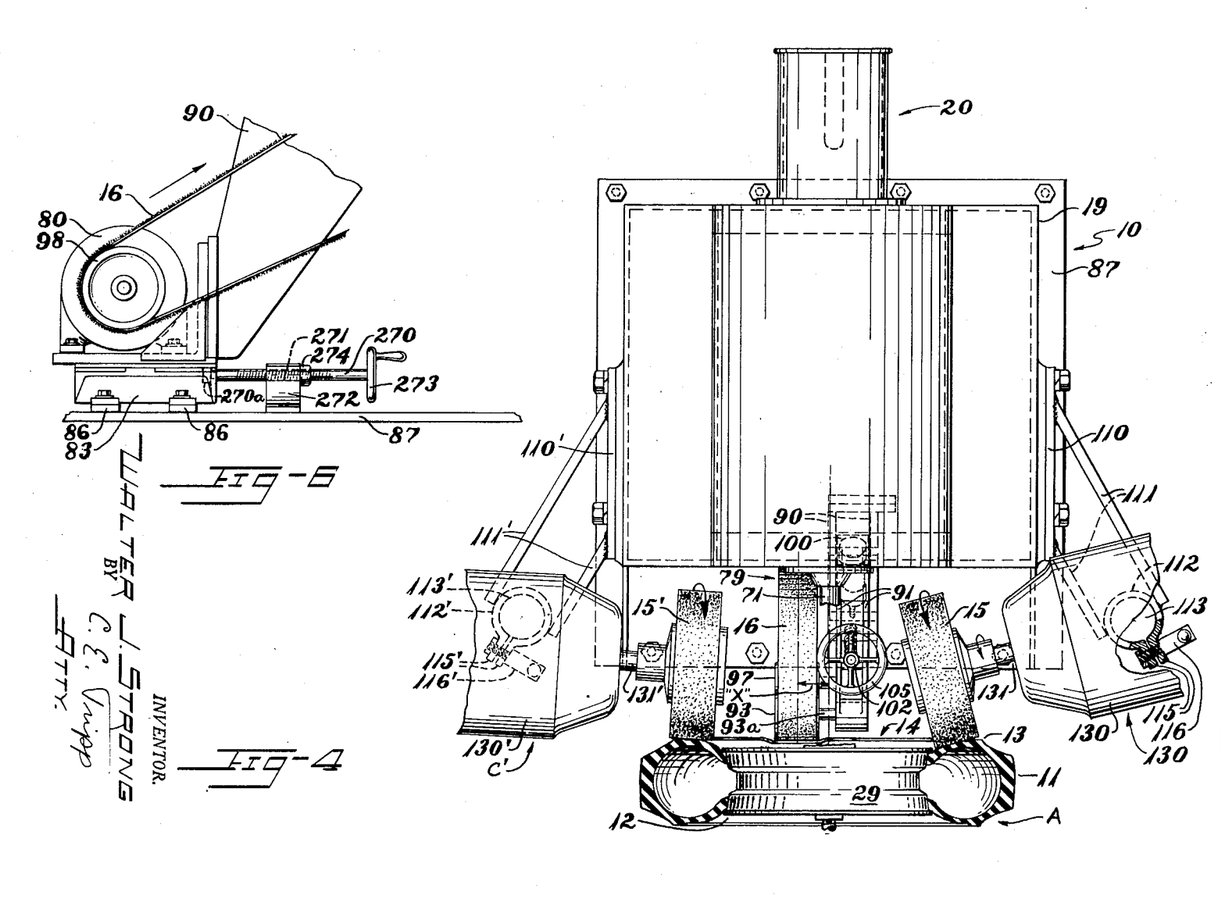
Fig. 4 is a fragmentary plan view of the sidewall cleaning and rib grinding elements of the apparatus of Fig. 1.
Fig. 6 is a fragmentary view of a modification of the motor mounting for the abrasive belt.

As best seen in Figs. 1 and 2, extending upwardly from carriage 83 are spaced support plates 90 between which are mounted two belt positioning arms. The upper arm 91 determines the working position of the abrasive belt 16 and is pivotally mounted between plates 90 by a pin 92. At the outer end of arm 91 a back-up roller 93 is rotatably mounted on an axle 93a extending laterally from arm 91. In order to apply tension to the belt a lower arm 95 is pivotally mounted between plates 90 by axle 96, and supports an idler roller 97 at its outer end. The belt is driven by pulley 98 mounted on the motor shaft. In order to maintain a constant tension on the abrasive belt, a single acting air cylinder 100 is pivotally mounted at one end between plates 90 and has a piston rod 101 pivotally connected to the lower belt tensioning arm 95 intermediate the ends of the arm. Compressed air is supplied to cylinder 100 by inlet 101a at a pressure whereby the abrasive belt is maintained at a predetermined constant tension. The working position of back-up roller 93 is determined by the diameter of the rib on the tire, and hence roller 93 is vertically adjustable. To this end, a threaded rod 102 is rotatably mounted in a block 102a, the block being mounted on trunnions between plates 90. The threaded rod extends through an internally threaded block 103 pivotally mounted by trunnions 104 to upper arm 91, it being understood that both arms 91 and 95 are made up of spaced plates. A handwheel 105 is fixed to the end of the threaded rod, rotation of the handwheel causing block 103 to advance along the threaded rod thereby vertically positioning roller 93. As indicated in Fig. 4, the midplane of the belt is offset from the axis of spindle 25 by a distance X, for purposes to be described. The belt 16 is a fabric-backed abrasive belt and a #80 grit on a 3" wide belt has been found to work satisfactorily.

*Sidewall cleaning assemblies*

Mounted on each side of frame 19 are the sidewall cleaning assemblies C and C', the corresponding parts of each being identical so that the details of only one will be described, the corresponding parts of the other being given the same reference characters, primed.

As best seen in Fig. 4, two parallel heavy plates 111 are welded at an acute angle to a base plate 110 which in turn is bolted to the sidewall of frame 19. In order to provide for angular adjustment of the brush rotation axis relative to the tire rotation axis, the free ends of plates 111 are welded to a split clamping sleeve 112 arranged for gripping a post 113 that supports the cleaning assembly base plate, the post being perpendicular to the axis of tire rotation. Post 113 has a flange 114 that rests upon the upper end of the split clamp sleeve, and is retained by a lower collar 114a pinned or otherwise fixed to the post. In order to clamp the post in place, flanges 115 project radially from clamp sleeve 112 at each side of the split therein and are forced together to grip the support post by a shouldered screw 116, the reduced diameter portion 116a of the screw being threaded into a collar 116b welded to associated flange 115.

In order to provide for radial adjustment of the cleaning brush relative to the tire, a base plate 120 is mounted on flange 114 of the post and is formed with a pair of tapered ways 121 for slidably receiving an intermediate carriage 123. The ways are disposed so that the intermediate carriage moves in a plane perpendicular to the axis of post 114. Position of the intermediate carriage is maintained by set screws 124 threaded into intermediate carriage 123 and pressing against one of the ways 121 of base plate 120. In operation, the post 114 is clamped so that the ways 121 of the base plate are oriented for radial, or side-to-side motion of the cleaning assembly.

In order to provide for axial adjustment of the brush relative to the tire, intermediate carriage 123 is formed with tapered ways 126 extending perpendicular to ways 121, and formed to slidably mount an upper plate 125 that serves as the motor base. Ways 126 are also disposed so that the motor base plate moves in a plane perpendicular to the axis of the post. Adjustment of the motor base plate on the intermediate carriage is maintained by set screws 128 arranged in the usual manner. The brush motor 130 is mounted on the motor base plate 126 with the motor shaft 131 parallel to the lower set of ways 121, the shaft axis and that of the tire mounting spindle lying substantially in the same plane.

To facilitate radial adjustment of the brush, a crank 132 is fixed to a threaded shaft 133 rotatably mounted and axially fixed in base plate 120. Plate 120 is longitudinally grooved as at 134 (see Fig. 3) to receive a threaded block 135, fixed to the bottom face of intermediate carriage 123 and threaded on adjusting screw 133 so that rotation of the crank 132 effects radial adjustment of the brush relative to the tire. Axial adjustment of the brush relative to the tire is accomplished by rotation of a crank 140 on rotatable threaded adjusting screw 141 axially fixed in intermediate carriage 123. Carriage 123 is likewise grooved as at 142 to receive an internally threaded block 143, fixed to the bottom face of intermediate carriage 123 and threaded on screw 141 so that rotation of crank 140 adjusts the brush axially of the tire. The procedures for final adjustment of the brush assemblies to a given tire size are explained in detail later in this specification.

Good results with the apparatus of this invention have been had by employing brushes that are 14 inches in diameter and 4 inches wide and the fibers are formed of Tampico fiber. The brush width is selected so as to be greater than half the radial extent of the white sidewall of the largest tire to be cleaned. Good results are obtained if a brush constructed as above is rotated at 1800 R. P. M.

*Control system*

Figure 5:
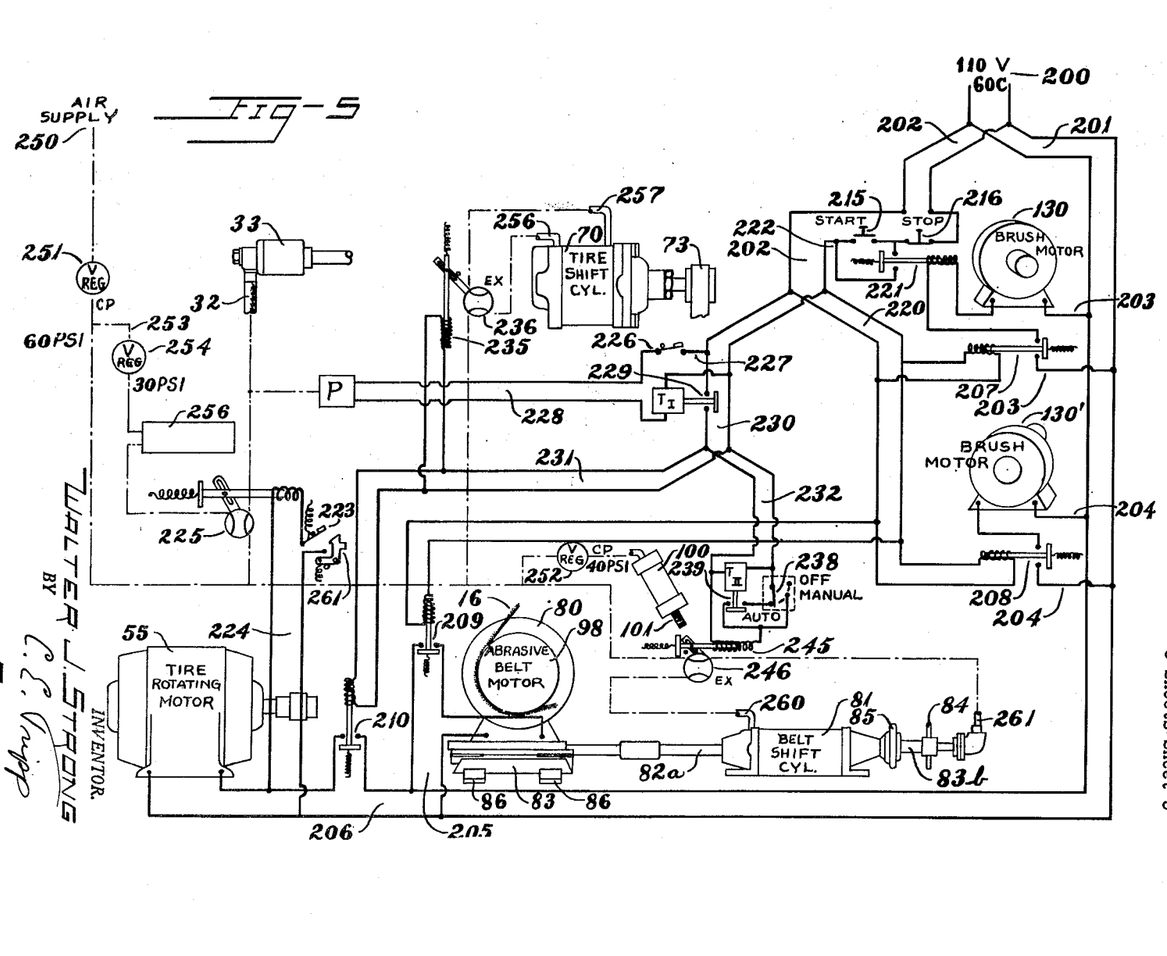
Fig. 5 is a diagram of the electrical and hydraulic control circuits of the apparatus.

In the diagram of Fig. 5 the principal mechanical motor units are drawn in the same relative positions in which they appear in Fig. 2. In addition the electrical controls (many of which will be in a panel box) are shown in diagrammatic form on the drawing, and the fluid pressure circuits appear in the diagram as broken lines.

Considering first the electrical system, current is supplied by a 110 volt, 60 cycle source 200, which connects to a motor supply circuit 201 and a control circuit 202. Motor supply circuit 201 has connected thereto brush motor supply lines 203 and 204, abrasive belt motor supply lines 205 and the tire rotating motor supply line 206, each motor supply line including respectively a normally open relay switch 207, 208, 209 and 210, the solenoids of the relays being connected to the control circuit.

A normally open start switch 215 and a normally closed stop switch 216 are connected in series in the control circuit 202. When start switch 215 is closed a relay control circuit 220 is energized which closes the relay switches 207, 208 and 209, energizing motor circuits 203, 204 and 205 thereby starting the two brush motors 130 and 130' and the abrasive belt motor 80. The brush motor supply circuit 203 also includes in series the coil of a normally open holding relay 221, which being energized, completes a circuit 222 that by-passes the normally open start switch, so that the latter need only be closed momentarily. Thus, until stop switch 216 is depressed, the brush motors and the belt motor will run continuously.

To initiate a cycle of cleaning the sidewall and abrading the rib of a tire, a tire is mounted on the rim and a foot switch 203 is depressed and latched, thereby energizing a supply line 224 connected off the motor supply line and energizing the solenoid of an air-distributing valve 225 so as to inflate the tire. The air connections to this valve will be explained in detail when the air circuits are described. After the tire is mounted, a foot switch 226 is depressed thereby energizing a timer $T_1$ by circuit 227, providing safety circuit 228 is completed by a pressure switch P piped into the air line to the tire. Switch P is set to close its circuit only when the tire is at full inflation pressure. Timer $T_1$ in turn closes switch 229, energizing a cycle control circuit 230 after sufficient time has elapsed for the brush and belt motors to come up to speed and the chuck cylinder to operate and cause the tire to be firmly mounted. Timer $T^1$ is also set to automatically open switch 229 after elapse of the time required for cleaning of the tire sidewall.

Cycle Control circuit 230 has two branches, a tire rotation and shift control circuit 231, and an abrasive belt unit shift control circuit 232. When energized, tire control circuit 231 closes a relay switch 219, which starts the tire rotating motor 55. Circuit 231 also energizes a solenoid 235, which shifts an air-distribution valve 236 for tire shift cylinder 70, to bring the tire against the brushes. The belt unit shift control circuit 232, which was also energized by timer $T_1$, in turn energizes a second timer $T_2$, the purpose of which is to permit independent control of the length of time that the abrasive belt is advanced against the tire, but the timer $T_2$ may be by-passed by a selector switch 238. Switch 238 has three positions, "Auto," "Manual," and "Off." With selector switch 238 set to "Auto," when timer $T_2$ is energized, it closes a switch 239, and a solenoid 245 is energized which shifts an air-distribution valve 246, to cause the belt shift cylinder to advance the abrasive belt against the tire. Timer $T_2$ automatically opens switch 239 after elapse of the time required for proper abrading of the tire curb strip, which time is ofter shorter than, but not longer than, the time required to clean the sidewall. If the selector switch is set to "Manual," timer $T_2$ is by-passed and the operation of solenoid 245 and hence the belt shift cylinder is controlled by timer $T_1$, with which the abrading and cleaning cycles are co-extensive. If the selector switch is set to the "Off" position, the abrasive belt remains in its retracted position, and only the white sidewall is treated.

The air system includes an air source 250 that connects to a reducing valve 251 maintaining a constant pressure in the air supply system of 60 p. s. i., and air at this pressure is supplied directly to the three air-distribution valves 225, 236 and 246 referred to as well as to a second reducing valve 252 which supplies compressed air at a constant pressure of 40 p. s. i. to the single-acting, belt-tensioning cylinder 100.

Air valve 225 is a four-way valve that receives air from the 60 p. s. i. regulator at line 253, by way of another reducing valve that reduces the pressure to tire inflation pressure of about 30 p. s. i. An accumulator 256 is in the line to provide for rapid inflation. In Fig. 5, valve 225 is shown in the position it assumes prior to the start of a cycle, in which position the outlet of the valve is plugged and the other valve passage connects inflation pipe 32 to exhaust. When the valve 225 is electrically shifted, compressed air is directed to pipe 32 to inflate the tire. The pressure switch P is connected into the line 32 so that no further operation is possible until the tire is inflated.

Upon completion of all operations on the tire, and after tire rotation has ceased and the tire has advanced away from the tools, the latch for switch 223 may be released, whereupon the valve 225 snaps back to the position shown in Fig. 5, deflating the tire.

As mentioned, four-way valve 236 is operated by solenoid 235 to control the axial position of the tire. Valve 236 is connected to opposite sides of the tire shift cylinder by means of pipes 256 and 257, the valve being arranged to connect one side or the other of the cylinder to the air source and to connect the opposite side to exhaust. Valve 236 is spring loaded toward the position wherein it directs air to pipe 256 of tire shift cylinder 70 with which the tire is held clear of the brushes when solenoid 235 is de-energized. When the solenoid is energized by foot switch 226 and timer $T_1$, valve 236 reverses the air flow, directing air to pipe 257 whereby the tire is brought against the brushes.

In order to control the position of the abrasive belt, an air valve 246 is provided which directs the air to either of two cylinder pipes, 260 or 261, and opens the other to exhaust. Air valve 246 is spring loaded to a position that causes retraction of the abrasive belt unit when its control solenoid 245 is de-energized. Shifting of valve 246 by solenoid 245 (under control of one or both timers depending upon the position of the selector switch) reverses the air connections to the belt shift cylinder 81 and the carriage, motor and belt are advanced until the piston 82 engages the adjustable stop 83a, at which time the abrasive belt presses against the tire rib 13.

*Preliminary adjustments*

The mechanical construction of the machine and the provision for various adjustments have been described in detail, and the preferred order of making the adjustments for a selected tire size will now be explained.

An important feature of the apparatus of this invention is the disposition of the brushes relative to the tire. As best seen in Figs. 3 and 4 the brushes are so disposed that brush 15 cleans the radially inner zone of tire sidewall 12, whereas brush 15' cleans the radially outer zone of the sidewall, there being some overlap at the mid-area of the tire sidewall. To this end, each brush mounting is so adjusted that its axis is parallel to the chord of the sidewall arc or span of sidewall which it cleans. Under these conditions, the fibers at the central zone of each brush are not bent over by the tire much more than are the fibers at the edge of the brush, so that across the width of the brush, the cleaning is largely accomplished by the tip ends of the brushes, which type of operation has been found to be superior to an action wherein the individual fibers are so bent as they pass over the tire that the sides of the fibers must be relied upon for a large part of the cleaning action. Specifically, I have found that if a single brush is employed to clean the entire sidewall, the cleaning action is not uniform across the sidewall and the brush fibers at the mid-zone are bent over sufficiently to partially destroy their effectiveness, and the brush tends to smear the sidewall rather than clean it. On the other hand, with the apparatus of this invention, the bending of the fibers at the mid-zone of each brush is one-fourth as great as that encountered with a single brush extending entirely across the same size tire sidewall, the result being not only an attractive and uniformly cleaned sidewall, but in addition a more rapid cycle may be employed and all of this is accomplished with a light brush pressure and consequent long brush life.

The angular adjustments just described are accomplished by unclamping the split clamp sleeves that mount the brush support posts, adjusting the angular disposition of the brush axes in accordance with the principles just outlined, and tightening the clamps. I contemplate that matching scribe marks be placed on the split sleeves 112 and 112' and upper flanges 116 and 116' to record the adjustment for each selected tire size.

The next brush adjustment involves bringing the mid-plane of the brushes substantially in alignment with the midportion of the respective white sidewall arcs to be cleaned by the brushes. This is accomplished with handwheels 132 and 132' which displace the brushes along their own axes and hence the angular adjustment just made is not disturbed. This adjustment is not too fussy because the brushes are selected so as to be wider than their respective arcs of coverage, and brush 15' is of such a width that it can also clean the rib 13 on the tire. For convenience, both brushes may be of the same width. Scribe marks are placed in lower plates 120 and 120' and the intermediate carriages 123 and 123' to record these adjustments.

The final brush adjustment determines the extent to which the tire deflects the brush bristles as it is brought rearwardly against the brushes. This is accomplished by handwheels 140 and 140' which move the brushes in a direction perpendicular to the axes and hence the more critical angular adjustment is not affected. Again scribe marks are made across the upper and intermediate carriages to record the adjustment for each tire size.

The radially outer brush 15' is axially adjusted so that it engages not only its allotted sidewall zone, but also acts upon the tire rib 13, giving both the sidewall and the rib a uniform surface finish.

The next adjustment is that of setting the operating position of abrasive belt assembly. This actually involves two adjustments, one adjustment determines the vertical disposition of back-up roller 93 and hence determines the vertical position of the line of contact of the belts with the tire rib, and the other determines the forward position of the belt. The vertical disposition of roller 93 is controlled by rotation of handwheel 105 which causes the end of arm 91 to move generally vertically. It will be recalled that roller 93 is displaced laterally from the tire axis by a distance $x$ (see Fig. 4) in order that the belt will extend across the tire rib, and yet the working zone of the belt is wider than the radial dimension of the rib so that belt wear is distributed. With a 3" belt, distance $x$ may be 2½" for good operation. The vertical adjustment consists of manipulating handwheel 105 until the line of contact of the abrasive belt with the rib 13 extends entirely across the rib. This adjustment can be re-established by the use of a series of C-shaped gauges or collars that fit around screw 102, the thickness of a given gauge being such that when it is slipped over screw 102 and the handwheel 105 turned to press the gauge between the handwheel and trunnion block 103, the correct vertical adjustment of the abrasive belt is had for the tire size corresponding to the markings on the gauge. After completion of the vertical adjustment of the abrasive belt, forward position of the belt is adjusted, which determines the degree of pressure with which the belt engages the tire rib. This adjustment is made for each tire size by loosening lock nut 85 and turning handwheel 84 thereby adjusting the position of stop 83a within the belt shift cylinder. Reestablishment of the this adjustment is facilitated by the use of another set of C-shaped gauges or collars that fit between handwheel 84 and lock nut 85, the axial extent or thickness of each collar corresponding to a given tire size.

Since the abrasive belt, once adjusted, always assumes a fixed forward position, the working pressure of the belt against the tire rib is caused by deflection of the tire sidewall. Also, since the abrading and cleaning operations are essentially different in character, it would require a rather careful adjustment of the belt position to cause completion of the rib abrading operation to occur simultaneously with completion of the sidewall cleaning operation. Herein lies an advantage of the independent retraction of the belt unit. The above adjustment is made so that the pressure engagement of the belt and tire rib is adequate to insure completion of the abrading operation during the cleaning cycle, and in fact, to accommodate variation in the tires, such pressure is adjusted so as to insure completion of the abrading step before the sidewall cleaning is completed, whereupon the belt is independently withdrawn and there is no danger that the tire itself will be moved clear of the brushes (and hence of the belt) before the rib is properly abraded.

Also, since the tire is held by inflation, it is accurately bellied out as opposed to dependence upon its own resiliency as would be the case with mechanical gripping of the tire. This insures even abrasion of the rib, even though some tires are stored flat and others suspended.

*Summary of operation*

Operation of the machine will be largely apparent from the preceding detailed description of a preferred embodiment thereof and will therefore be described only briefly here.

Before the machine is started, the above-described adjustments are made for the particular tire size at hand. Care is taken to see that latch for switch 226 is released and compressed air and electric power are supplied to the machine. The start button 215 is depressed, closing relays 207, 208, and 209, and starting brush motors 130, 130' and belt motor 80, which motors remain running until the stop button is depressed. At this time not only is the tire chuck in its open position, it is also in its forward position and the abrasive belt is retracted. Selector switch 238 is usually left in the "Auto" position during operation of the machine.

A tire is placed on the rim with the sidewall to be treated (usually a white sidewall) facing rearward of the machine. Foot switch 223 is depressed and latched, whereupon valve 225 is shifted to direct air to the tire for inflation.

The machine operator next depresses foot switch 226, whereupon timer $T_1$, after a short delay, energizes control circuits 231 and 232. Relay 209 now starts the tire rotating motor 55 and solenoid 235 shifts valve 236 to cause the tire shift cylinder to retract the spindle connected thereto and thus bring the tire sidewall against the rotating brushes. After a short delay (during which the tire is certain to be up to its desired speed of rotation), timer $T_2$ closes its circuit whereupon solenoid 245 shifts air valve 246 causing the belt shift cylinder to advance the abrasive belt unit against its stop whereupon abrading of tire rib 13 begins. Cleaning and abrading are now in process.

In "Auto," timer $T_2$ is set so that the abrasive strip is maintained against the tire rib for a length of time sufficient to remove the outer thin layer of rubber that overlaps the rib, so that the rib will be either all white or all black depending upon the manner in which the sidewall was constructed. This usually requires less time than is required to complete the sidewall cleaning operation. For example, with the machine of this invention, and with a typical passenger car tire, the time required to abrade the rib might be in the order of 10 seconds whereas that required to clean the sidewall might be in the order of 20 seconds. In this case, after elapse of 10 seconds, timer $T_2$ opens its circuit, deenergizing solenoid 245, and causing air valve 246 to reverse the air connections, shifting the abrasive belt assembly 15 rearwardly and out of contact with tire 11. The sidewall cleaning operation will, in the example given, continue for approximately ten more seconds, whereupon timer $T_1$ opens its control circuits thus deenergizing solenoid 235 to cause the tire shift cylinder to move the tire away from the brushes, and also deenergizing solenoid 209 to open the circuit to the tire rotating motor. The tire quickly coasts to a stop, and can be removed from the rim by releasing latched switch 223 causing valve 225 to shift to its normal position whereupon the tire is opened to exhaust releasing the tire for removal by the operator. The brush drive and abrasive belt motors continue to run, and the machine is ready at once for another cycle of operation. It has been found that it requires approximately 20 seconds to remove one tire from the machine and replace it with another, and, as mentioned, assuming a typical 20 second cleaning cycle, the total time will be in the order of 40 seconds, per tire, meaning that 90 tires may be processed in one hour on one machine.

Since the tire rib abrading operation can, with the machine of this invention, be carried out rapidly enough so as to insure that the rib treatment will be completed before the sidewall is cleaned, it is possible to adjust the embodiment of the invention just described so that the rate of rib abrading permits withdrawal of the abrasive belt before the tire is moved away from the sidewall cleaning brushes, thereby assuring that both processes will be completed, but not over-done during a cycle. I have found that this advantage may be attained in a modified form of the invention by careful adjustment of a somewhat simplified belt unit, shown in Fig. 6. Here the belt unit shift cylinder and its controls are omitted and the abrasive belt unit remains in a selected position, just as do the brushes.

*Modified form*

In the modified construction, a threaded shaft 270 has its inner end rotatably mounted in carriage 83 and retained by a collar 270a. A block 272 is bolted to the machine frame and provided with a threaded bore 271 that receives the threaded shaft. A handcrank 273 on the other end of the threaded shaft facilitates adjustment there being a locknut 274 provided to maintain the adjustment. In this form, carriage 83 is set to a fixed position determined by the amount of material to be removed from the tire rib and the rate at which the abrasive belt removes such material as compared to the rate at which the brushes clean the sidewall. The tire sidewall will be initially deflected when the tire rib is brought against the abrasive belt, which deflection can represent the amount of rubber to be removed from the tire rib. Thus when the predetermined amount of rubber is removed from the rib, there will be little if any pressure between the rib and the abrasive belt, and the belt will no longer abrade the rib to any substantial degree. It only remains to adjust the belt carriage by means of handwheel 273 so that the desired maximum amount of rubber (tire deflection by the belt) will be removed before the sidewall cleaning action is completed, whereupon the results of the previously described embodiment of the invention will be duplicated. In practice, the thickness of the rubber layer removed from the rib is always small enough so that deflection of the tire by the belt and its back-up roller 93 has no appreciable effect on the bending of the bristles of the sidewall cleaning brushes in both embodiments of the invention.

Although reference to treating a white sidewall tire has been made in this description, it is to be understood that the sidewall of any tire can be cleaned by the machine.

Having completed a detailed disclosure of the preferred embodiment of my invention so that those skilled in the art may practice the same, I contemplate that variations may be made without departing from the essence of the invention or the scope of the appended claims.

I claim:

1. Apparatus for cleaning the sidewall of a rubber tire comprising a frame, a tire rim rotatably mounted on the frame, means for rotating said rim, means for inflating a tire on the rim, a pair of tire sidewall cleaning means mounted on said frame for rotation about axes generally radial of the tire and spaced circumferentially about the tire sidewall and having peripheral sidewall cleaning surfaces, means to rotate said cleaning means, means to cause engagement of the tire sidewall and cleaning means, one of said cleaning means being disposed on said frame with the axis of rotation thereof substantially parallel to the cord of an arc that encompasses substantially one-half the radial extent of the tire sidewall area to be cleaned, the axis of rotation of said other cleaning means being correspondingly disposed for cleaning the remainder of said sidewall area.

2. Apparatus for cleaning the sidewall of a rubber tire comprising a frame, a tire rim rotatably mounted on the frame, means for rotating said rim, means for inflating a tire on the rim, a pair of rotary type bristle brushes mounted on said frame for rotation about axes generally radial of the tire and spaced circumferentially about the tire sidewall, means to rotate said brushes, means to cause engagement of the tire sidewall with tips of the brush bristles, one of said brushes being disposed on said frame with the axis of rotation thereof substantially parallel to the cord of an arc that encompasses substantially one-half the radial extent of the tire sidewall area to be cleaned, the axis of rotation of said brush being correspondingly disposed for cleaning the remainder of said sidewall area.

3. Apparatus for cleaning the sidewall and abrading the curb rib of a rubber tire comprising a frame, a tire rim rotatably mounted on the frame, means for rotating said rim, means for inflating a tire on the rim, a pair of tire sidewall cleaning means mounted on said frame for rotation about axes generally radial of the tire and spaced circumferentially about the tire sidewall and having peripheral sidewall cleaning surfaces, means to rotate said cleaning means, means to cause engagement of the tire sidewall and cleaning means, a curb rib abrasive unit mounted on said frame between said cleaning means, one of said cleaning means being disposed on said frame with the axis of rotation thereof substantially parallel of the cord of an arc that encompasses substantially the radially inner half of the radial extent of the tire sidewall area to be cleaned, the axis of rotation of said other cleaning means being correspondingly disposed relative to the radially outer half of said sidewall area, said latter cleaning means also engaging the curb rib.

4. Apparatus for cleaning the sidewall of a rubber tire comprising a frame, a tire rim rotatably mounted on the frame, means for rotating said rim, means for inflating a tire on the rim, a pair of tire sidewall cleaning units, means for mounting said units on said frame; said mounting means each comprising a base plate, means mounting said base plate on said frame for pivotal adjustment about an axis offset from and perpendicular to said tire rotation axis, an intermediate carriage mounted on said base plate for rectilinear motion in a plane perpendicular to said pivot axis, and a motor base mounted on said intermediate carriage for rectilinear motion in a plane perpendicular to said pivot axis and in a direction perpendicular to the rectilinear motion of said base plate; a motor on each motor base with its shaft axis parallel to the rectilinear motion of said base plate and substantially intersecting said tire rotation axis, and a brush on each motor shaft; and means to shift said tire rim axially toward and away from said brushes.

5. Apparatus for finishing a tire sidewall having a circumferential rib thereon comprising a frame, a tire rim rotatably mounted on said frame and shiftable in an axial direction, means for inflating a tire on the rim, means to rotate said rim, sidewall cleaning means disposed in the path of axial motion of the sidewall of a tire mounted on said rim, a tire rib abrading unit mounted on said frame for shifting motion toward and away from the rib on a mounted tire, means to shift said tire rim from a first position wherein a mounted tire clears said sidewall cleaning means to a second position wherein the tire is pressed against the cleaning means, means to shift said rib abrading unit from a first position wherein it clears the tire rib to a second position wherein it abrades the tire rib, said sidewall cleaning means engaging both the tire sidewall and rib, means to retract said abrading element to said first position while said tire rim remains in its second position against the sidewall cleaning means, and means to retract said tire rim to its first position clear of the sidewall cleaning means.

6. The method of finishing the sidewall and curb rib of a tire comprising the steps of simultaneously abrading away an outer layer of the curb strip and brushing the sidewall and curb strip of an inflated, rotating tire to clean and smooth both; and stopping abrasion of the curb strip while continuing brushing the sidewall and abraded curb strip of the tire whereby more material is removed from the curb strip than from the sidewall but both have substantially the same final finish.

References Cited in the file of this patent

UNITED STATES PATENTS

| | | |
|---|---|---|
| 1,283,948 | Stevens | Nov. 5, 1918 |
| 1,480,542 | Brown | June 15, 1924 |
| 1,848,684 | Woock | Mar. 8, 1932 |
| 1,956,331 | Mullin | Apr. 24, 1934 |
| 2,045,778 | Huntley et al. | June 30, 1936 |